US006064211A

United States Patent [19]

Spooner

[11] Patent Number: 6,064,211

[45] Date of Patent: May 16, 2000

[54] SPARK PLUG TESTER

[76] Inventor: Michael F. Spooner, P.O. Box 9169, Warwick, R.I. 02889

[21] Appl. No.: 09/267,020

[22] Filed: Mar. 11, 1999

[51] Int. Cl.[7] .......................... G01M 19/02; F02P 17/12

[52] U.S. Cl. .......................... 324/397; 324/393

[58] Field of Search .......................... 324/385, 388, 324/390, 393, 395, 396, 397, 398, 399, 400

[56] References Cited

U.S. PATENT DOCUMENTS

| | | | |
|---|---|---|---|
| 1,526,897 | 2/1925 | Boselli | 324/397 |
| 1,914,809 | 6/1933 | Kongsted | 324/397 |
| 3,793,582 | 2/1974 | Maria et al. | 324/400 |
| 3,904,955 | 9/1975 | Katz | 324/395 |
| 4,746,868 | 5/1988 | Davis | 324/400 |
| 5,426,369 | 6/1995 | Brinker | 324/400 |

*Primary Examiner*—Diep N. Do

[57] ABSTRACT

A tester for testing the spark plugs, distributor system, and wires used on combustion engines. The tester includes a housing that has an opening therethrough adapted and dimensioned for receiving a spark plug therethrough. The housing has at least one open face. A grounding rod is inserted through the aperture of the housing. The grounding rod is adapted for abutting a spark plug. A grounding wire is electrically connected to the grounding rod, which is adapted for coupling to a ground.

12 Claims, 2 Drawing Sheets

SPARK PLUG TESTER

BACKGROUND OF THE INVENTION

1. Field of the Invention

The present invention relates to engine testing devices and more particularly pertains to a new tester for testing the spark plugs, distributor system, and wires used on combustion engines.

2. Description of the Prior Art

The use of engine testing devices is known in the prior art. More specifically, engine testing devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,426,369; U.S. Pat. No. 3,828,246; U.S. Pat. No. 2,118,137; U.S. Pat. No. 3,904,955; U.S. Pat. No. 3,793,582; and U.S. Pat. No. Des. 391,503.

While these devices fulfill their respective, particular objectives and requirements, the aforementioned patents do not disclose a new tester. The inventive device includes a housing that has an opening therethrough adapted and dimensioned for receiving a spark plug therethrough. The housing has at least one open face. A grounding rod is inserted through the aperture of the housing. The grounding rod is adapted for abutting a spark plug. A grounding wire is electrically connected to the grounding rod, which is adapted for coupling to a ground.

In these respects, the tester according to the present invention substantially departs from the conventional concepts and designs of the prior art, and in so doing provides an apparatus primarily developed for the purpose of testing the spark plugs, distributor system, and wires used on combustion engines.

SUMMARY OF THE INVENTION

In view of the foregoing disadvantages inherent in the known types of engine testing devices now present in the prior art, the present invention provides a new tester construction wherein the same can be utilized for testing the spark plugs, distributor system, and wires used on combustion engines.

The general purpose of the present invention, which will be described subsequently in greater detail, is to provide a new tester apparatus and method which has many of the advantages of the engine testing devices mentioned heretofore and many novel features that result in a new tester which is not anticipated, rendered obvious, suggested, or even implied by any of the prior art engine testing devices, either alone or in any combination thereof.

To attain this, the present invention generally comprises a housing that has an opening therethrough adapted and dimensioned for receiving a spark plug therethrough. The housing has at least one open face. A grounding rod is inserted through the aperture of the housing. The grounding rod is adapted for abutting a spark plug. A grounding wire is electrically connected to the grounding rod, which is adapted for coupling to a ground.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new tester apparatus and method which has many of the advantages of the engine testing devices mentioned heretofore and many novel features that result in a new tester which is not anticipated, rendered obvious, suggested, or even implied by any of the prior art engine testing devices, either alone or in any combination thereof.

It is another object of the present invention to provide a new tester which may be easily and efficiently manufactured and marketed.

It is a further object of the present invention to provide a new tester which is of a durable and reliable construction.

An even further object of the present invention is to provide a new tester which is susceptible of a low cost of manufacture with regard to both materials and labor, and which accordingly is then susceptible of low prices of sale to the consuming public, thereby making such tester economically available to the buying public.

Still yet another object of the present invention is to provide a new tester which provides in the apparatuses and methods of the prior art some of the advantages thereof, while simultaneously overcoming some of the disadvantages normally associated therewith.

Still another object of the present invention is to provide a new tester for testing the spark plugs, distributor system, and wires used on combustion engines.

Yet another object of the present invention is to provide a new tester which includes a housing that has an opening therethrough adapted and dimensioned for receiving a spark plug therethrough. The housing has at least one open face. A grounding rod is inserted through the aperture of the housing. The grounding rod is adapted for abutting a spark plug. A grounding wire is electrically connected to the grounding rod, which is adapted for coupling to a ground.

Still yet another object of the present invention is to provide a new tester that permits a user to test spark plugs without getting shocked.

Even still another object of the present invention is to provide a new tester that is small and portable.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
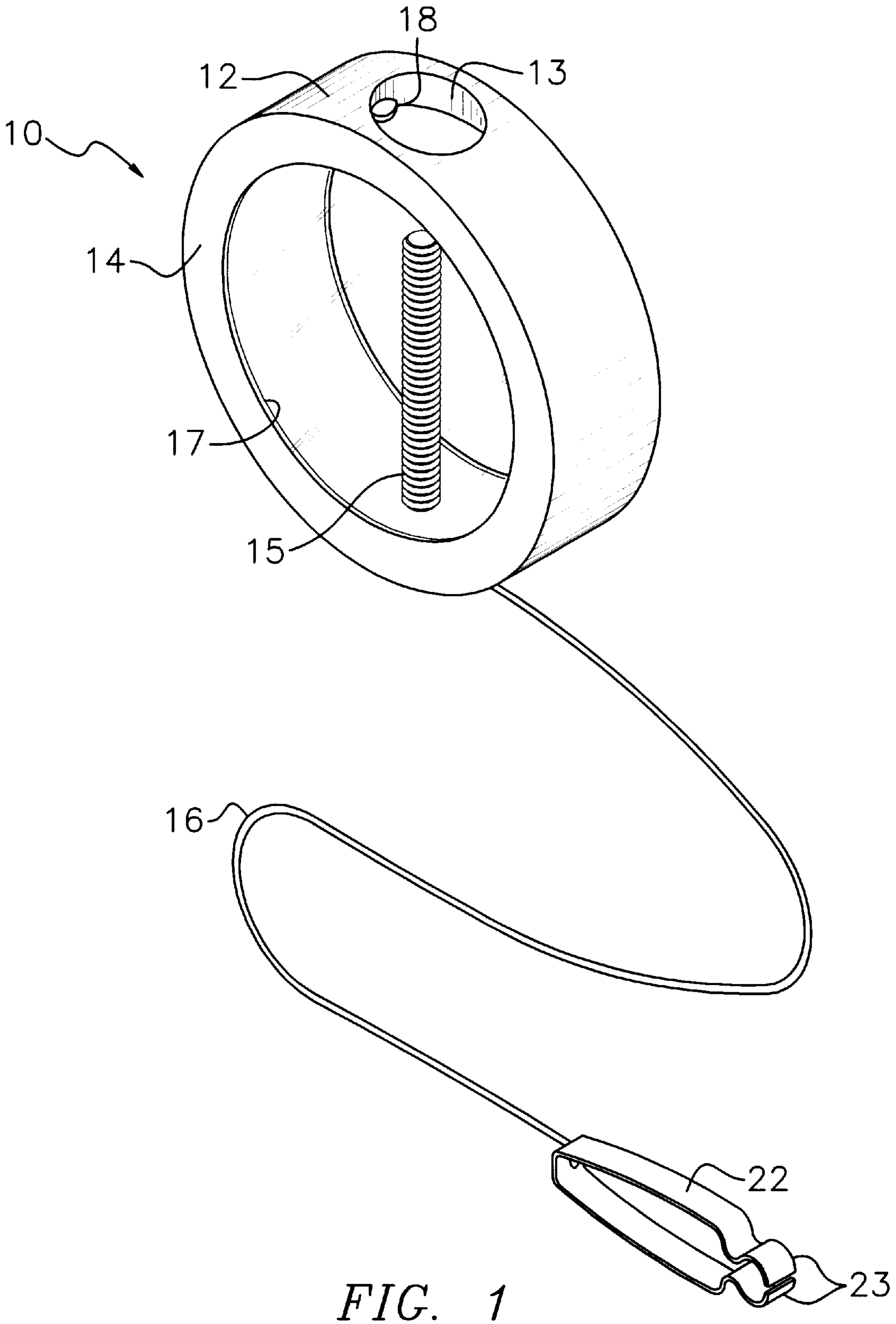
FIG. 1 is a schematic perspective view of a new tester according to the present invention.
Figure 2:
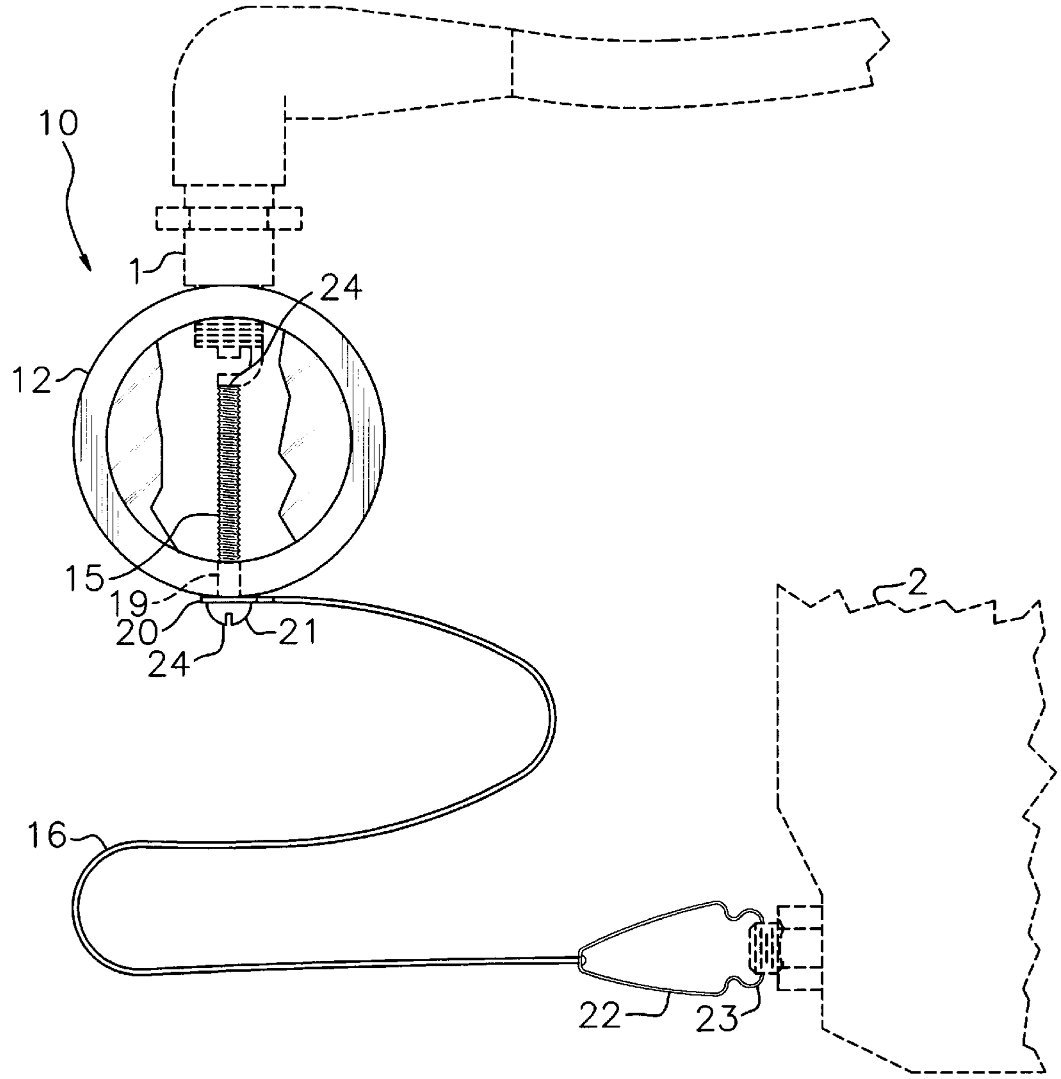
FIG. 2 is a schematic side view of the present invention in use.

With reference now to the drawings, and in particular to FIGS. 1 and 2 thereof, a new tester embodying the principles and concepts of the present invention and generally designated by the reference numeral 10 will be described.

As best illustrated in FIGS. 1 and 2, the tester 10 is adapted for testing the spark plugs 1, distributor system, and wires of a combustion engine of an automobile, motorcycle, ATV, marine motor, lawnmower, chain saw, or similar vehicle or piece of equipment. The tester generally comprises a housing 12 that has an opening 13 therethrough adapted and dimensioned for receiving a spark plug therethrough. The housing has at least one open face 14. A grounding rod 15 is inserted through the opening of the housing. The grounding rod is adapted for abutting a spark plug. A grounding wire 16 is electrically connected to the grounding rod, which is adapted for coupling to a ground 2.

Preferably, the housing is annular. Ideally, the housing is generally circular. A circular configuration is preferred so that the housing is more compact and so that the grounding wire can be wrapped around the outer periphery of the housing to maintain a thin profile for storage.

Also preferably, the housing comprises a substantially electrically nonconductive material such as polyvinyl chloride (PVC). This permits a user to hold the housing during testing without receiving a shock.

The housing has at least one open face so that a user can see the spark created by the spark plug when the motor is turned over. Preferably, the housing has a transparent panel 17 extending across the open face of the housing to protect the user from shock while permitting a view of the spark created by the spark plug.

Also preferably, the housing has a resiliently deformable rubber flap 18 extending into the opening of the housing. The flap helps hold the spark plug in the opening. The flap also permits spark plugs of varying sizes to be held in the opening of the housing.

Preferably, the housing has a threaded aperture 19 therethrough positioned opposite the opening of the housing. Also preferably, the grounding rod is also threaded and is threadedly inserted through the aperture of the housing. The grounding rod is adapted for abutting a spark plug.

The grounding wire is electrically connected to the grounding rod. Preferably, the grounding wire has an eyelet 20 coupled to a first end thereof. The grounding rod extends through the eyelet. The eyelet is positioned between a head 21 of the grounding rod and an outer surface of the housing.

Preferably, the grounding wire has an electrically conductive clamp 22 coupled to its second end. The clamp is adapted for coupling to a ground such as an engine block or negative terminal of a battery. Ideally, the clamp is rotatably coupled to the grounding wire.

Ideally, the clamp has a pair of opposed clamping portions 23 adapted for contacting the ground. In one embodiment of the clamp, the clamp is generally U-shaped and is resiliently deformable. A variation of the clamp would have a spring biasing the clamping portions towards each other. This type of clamp is known in the art and therefore is not shown in the illustrations.

The preferred inner diameter of the housing is between about 1 and 2 inches, ideally about 1½ inch. A width of the housing is defined between its front and back faces. The preferred width of the housing is between about ⅜ and ⅝ inches, ideally about ½inch.

The preferred length of the grounding rod between opposite ends 24 thereof is between about 1 and 1½ inch, ideally about 1¼ inch. This length was selected because it permits a spark plug to be inserted into the opening of the housing far enough not to slip out of the opening.

The preferred gauge size of the grounding wire is between about 10 and 20 gauge, ideally about 16 gauge. The preferred length of the grounding wire between its opposite ends is between about 4 and 24 inches, ideally about 6 inches. The preferred length of the clamp between opposite ends thereof is between about 1 and 2 inches, ideally about 1¼ inch.

In use, a spark plug is inserted in the opening of the housing such that it contacts the grounding rod. The wire from the distributor system is left connected to the spark plug. The clamp is clamped to a ground such as the engine block. The engine would be turned over so that the distributor system sends electrical pulses to the spark plug. The spark created by the spark plug is observed. A blue spark indicates that the spark plug and distributor system is operating properly. A light blue spark indicates that the spark plug and distributor system may not be operating properly. A yellow spark indicates that the spark plug or distributor system is not operating properly.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A tester for testing spark plugs, distributor system, and wires of a combustion engine, said tester comprising:

a housing having an dimensioned opening therethrough for receiving a spark plug therethrough;

said housing having at least one open face;

a grounding rod being inserted through an aperture positioned opposite said opening of said housing, said grounding rod for abutting a spark plug; and a grounding wire being electrically connected to said grounding rod, said grounding wire for coupling to a ground.

2. The tester of claim 1, wherein said housing is generally circular.

3. The tester of claim 1, wherein said housing comprises a nonconductive material.

4. The tester of claim 1, wherein said housing has a transparent panel extending across said open face of said housing.

5. The tester of claim 1, wherein said housing has a resiliently deformable flap extending into said opening of said housing, said flap being for helping hold said spark plug in said opening.

6. The tester of claim 1, wherein said aperture of said housing is positioned opposite said opening of said housing.

7. The tester of claim 1, wherein said grounding wire has an electrically conductive clamp coupled to a second end thereof, said clamp for coupling to said ground.

8. The tester of claim 7, wherein said clamp is rotatably coupled to said grounding wire.

9. The tester of claim 7, wherein said clamp has a pair of opposed clamping portions adapted for contacting said ground.

10. The tester of claim 7, wherein said clamp is generally U-shaped and is resiliently deformable.

11. The tester of claim 7, wherein said clamp has a spring biasing said clamping portions towards each other.

12. A tester for testing spark plugs, distributor system, and wires of a combustion engine, said tester comprising:

an annular generally circular housing having an dimensioned opening therethrough for receiving a threaded portion of a spark plug therethrough;

said housing comprising an electrically nonconductive material;

said housing having at least one open face;

said housing having a transparent panel extending across said open face of said housing;

said housing having a resiliently deformable flap extending into said opening of said housing, said flap being for helping hold said spark plug in said opening;

said housing having a threaded aperture therethrough positioned opposite said opening of said housing;

a threaded grounding rod being threadedly inserted through said opening of said housing, said grounding rod for abutting a spark plug;

a grounding wire being electrically connected to said grounding rod;

said grounding wire having an eyelet coupled to a first end thereof, said grounding rod extending through said eyelet, said eyelet being positioned between a head of said grounding rod and an outer surface of said housing;

said grounding wire having an electrically conductive clamp rotatably coupled to a second end thereof, said clamp for coupling to a ground;

said clamp having a pair of opposed clamping portions adapted for contacting said ground;

said clamp being generally U-shaped and being resiliently deformable;

wherein an inner diameter of said housing is between about 1 and 2 inches;

a width of said housing being defined between front and back faces thereof, wherein said width of said housing is between about $\frac{3}{8}$ and $\frac{5}{8}$ inches;

wherein a length of said grounding rod between opposite ends thereof is between about 1 and $1\frac{1}{2}$ inch;

wherein said grounding wire is between about 10 and 20 gauge;

wherein a length of said grounding wire between opposite ends thereof is between about 4 and 24 inches; and wherein a length of said clamp between opposite ends thereof is between about 1 and 2 inches.

* * * * *